(12) United States Patent
Yang et al.

(10) Patent No.: US 8,534,635 B2
(45) Date of Patent: Sep. 17, 2013

(54) SUPPORT FOR PORTABLE ELECTRICAL DEVICE

(75) Inventors: Zhi-Gang Yang, Shenzhen (CN); Qi-Chao Liu, Shenzhen (CN); He-Hui Yang, Shenzhen (CN); Ping Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 129 days.

(21) Appl. No.: 13/211,313

(22) Filed: Aug. 17, 2011

(65) Prior Publication Data
US 2012/0168590 A1 Jul. 5, 2012

(30) Foreign Application Priority Data
Dec. 31, 2010 (CN) .......................... 2010 1 0616891

(51) Int. Cl.
*A47G 1/24* (2006.01)
(52) U.S. Cl.
USPC ............................ 248/458; 248/454; 248/455
(58) Field of Classification Search
USPC ................. 248/444, 447, 454, 455, 457, 458, 248/460, 462, 292.12, 292.13, 292.11, 291.1, 248/121, 123.11, 123.2, 125.2, 125.9, 456; 403/105, 107, 108, 144, 359.4, 359.5, 359.6; 211/43, 42, 184, 26.2; 40/745, 747, 748; 108/1, 6, 8
See application file for complete search history.

(56) References Cited

U.S. PATENT DOCUMENTS

| 6,079,949 | A  | * | 6/2000 | Litvin .......................... 416/246 |
| 6,583,985 | B2 | * | 6/2003 | Nguyen et al. ........... 361/679.27 |
| 7,419,127 | B2 | * | 9/2008 | Buehler ................... 248/292.12 |
| 7,540,466 | B2 | * | 6/2009 | Yang ............................. 248/688 |
| 8,387,938 | B2 | * | 3/2013 | Lin ............................... 248/456 |
| 2012/0168581 | A1 | * | 7/2012 | Cheng et al. ............... 248/206.2 |

* cited by examiner

Primary Examiner — Alfred J Wujciak
(74) Attorney, Agent, or Firm — Altis Law Group, Inc.

(57) ABSTRACT

A support includes a base frame, a rotatable frame, an adjusting knob assembly and a spring element. Each leg of the base frame has a through hole formed with a protrusion and an L-shaped sliding groove. The rotatable frame pivotedly coupled to the base frame through a first shaft, which is rotatably inserted into the through hole and formed with a plurality of inner teeth. The adjusting knob has a guiding rib and a plurality of outer teeth respective to the inner teeth, and the guiding rib is slidable in and along the guiding groove portion and engagable in the engaging groove portion. The spring element surrounds the second shaft of the adjusting knob, as compressed between the protrusion and the insertion portion. Through operating the adjusting knob, the relative angle of the base frame and the rotatable frame switches between adjustable and fixed.

4 Claims, 7 Drawing Sheets

SUPPORT FOR PORTABLE ELECTRICAL DEVICE

BACKGROUND

1. Technical Field

The present disclosure relates to a support, more particularly to a multi-angle positional support for use in a portable electrical device.

2. Description of Related Art

Flat portable electrical devices like e-books or tablet PCs (tablet personal computers) have become prevalent. People usually utilize such a device to read documents or to watch videos. However, for the purpose of maintaining an appropriate angle of view, a user must hold the device immobile for a certain amount of time, which results in hand fatigue and other physical discomforts. A trembling hand reduces the quality of the viewing, thus a support helping to position the device and hold it steady is needed.

However, today's supports are usually formed fixedly, which does not allow any angular adjustment. Some other supports are foldable, but they are not also adjustable. Meanwhile, the above-mentioned supports usually have a complicated structure and are not convenient to carry.

BRIEF DESCRIPTION OF THE DRAWINGS

Other features and advantages of this disclosure will become more apparent in the following detailed description of the preferred embodiment of this disclosure, with reference to the accompanying drawings, in which.

DETAILED DESCRIPTION

Figure 1:
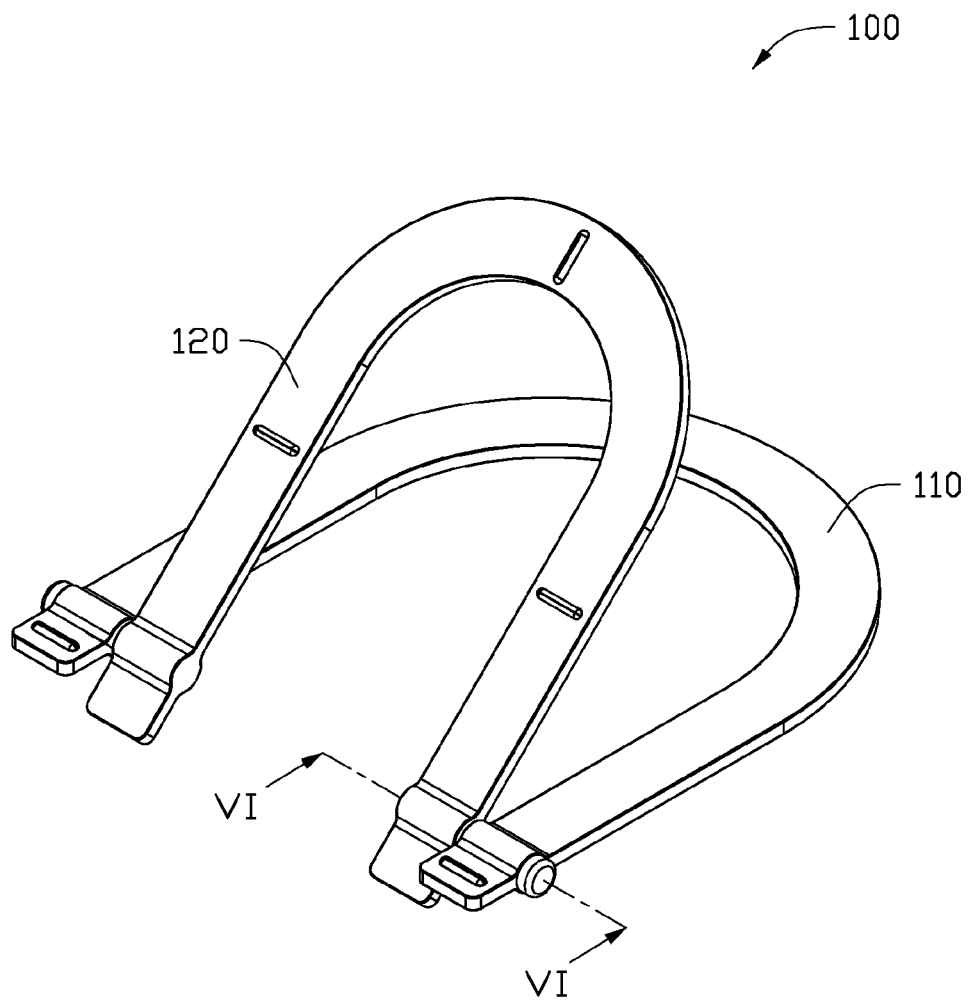
FIG. 1 is a perspective view of a support of the present disclosure.

FIG. 1 to FIG. 7 show the support 100 of the present disclosure. Referring to FIG. 1, the support 100 includes a base frame 110 and a rotatable frame 120, wherein both of the base frame 110 and the rotatable frame 120 are U-shaped flat bars in this embodiment, and the end portions of the two legs of the rotatable frame 120 are attached to the two legs of the base frame 110. Sine the rotatable frame 120 is pivotedly coupled to the base frame 110, the rotatable frame 120 can therefore rotate within or on the base frame 110 around an axis VI, either coplanar while carrying, or with an angular difference whilst in use.

When the support 100 is flat, the angle between the rotatable frame 120 and the base frame 110 is 0°. When the support 100 is in use, the relative angle is bigger than 0°, and the support 100 can therefore support the portable electrical device (not shown). In any event, the relative angle as aforesaid is adjustable.

Figure 2:
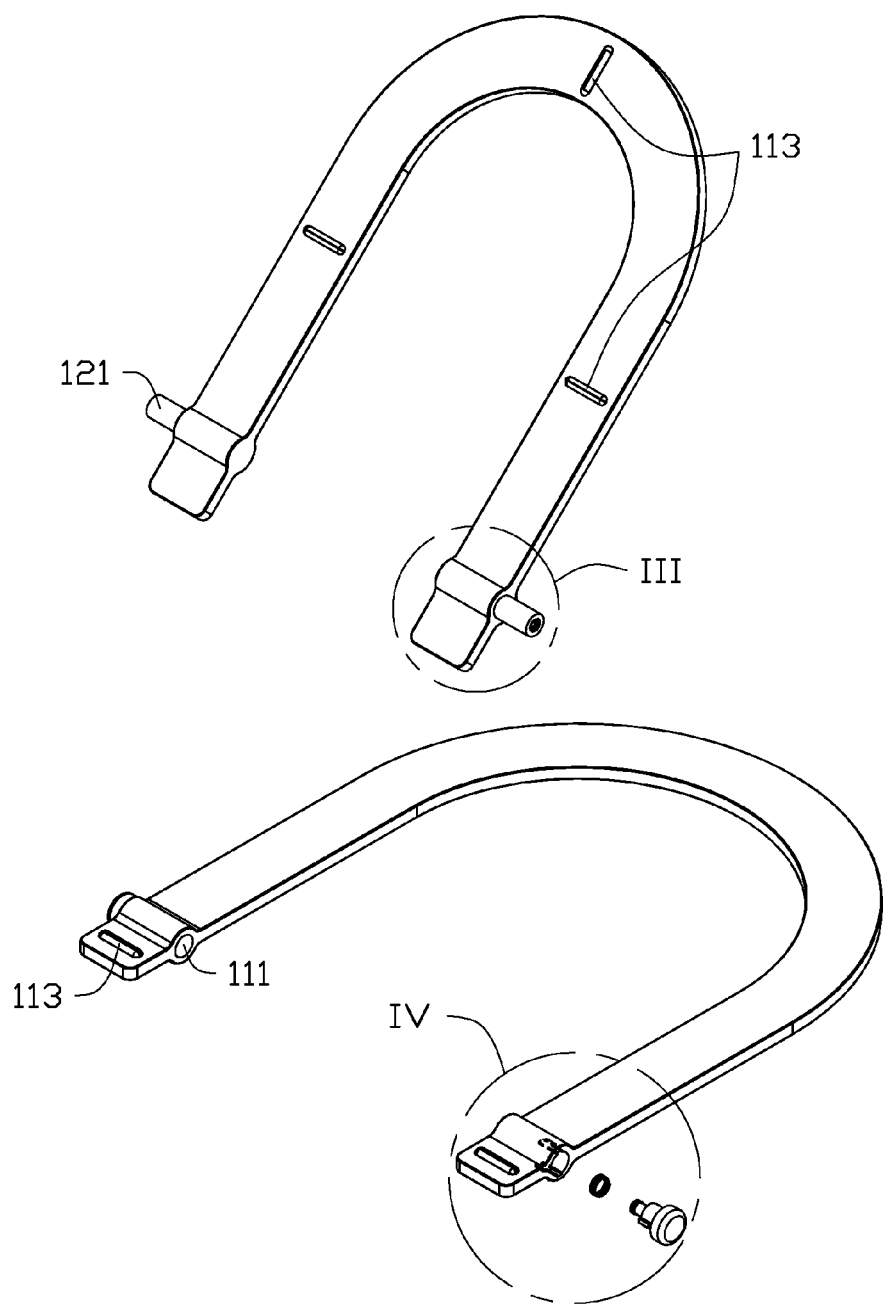
FIG. 2 is an exploded view of the support in FIG. 1.
Figure 3:
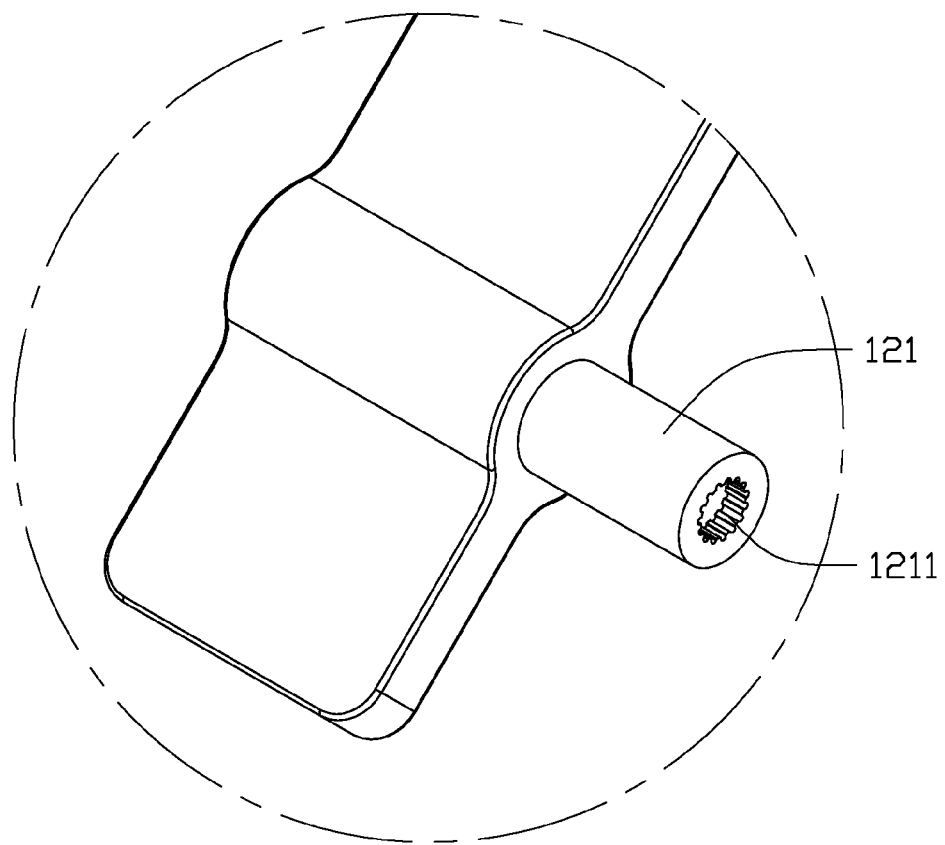
FIG. 3 is a schematic view of a circled part III of the support in FIG. 2.
Figure 4:
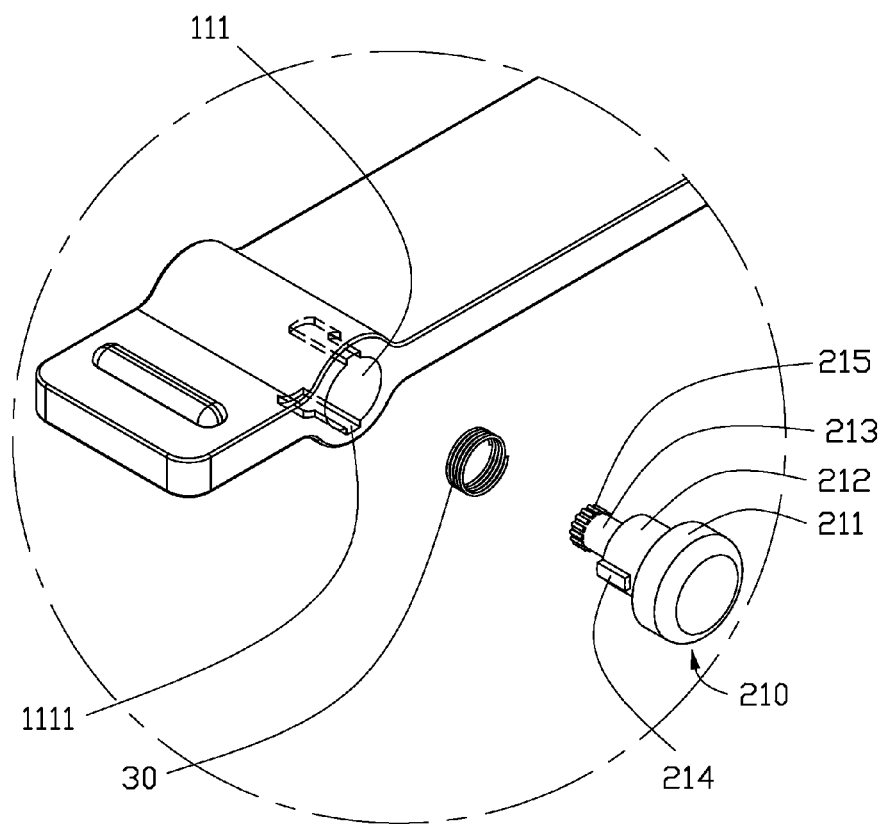
FIG. 4 is a schematic view of a circled part IV of the support in FIG. 2.

Referring to FIG. 2 to FIG. 4. A first shafts 121 protrudes from each leg of the rotatable frame 120, and the two first shafts 121 extend away from each other. The first shaft 121 includes a circular recess defined in an end face, wherein a plurality of inner teeth 1211 are formed on an internal circumferential sidewall in the recess.

Otherwise, there are several non-slip pads 113 arranged on the base frame 120 and on the rotatable frame 110 to cushion and frictionally support a portable electrical device. In this embodiment, said non-slip pads 113 provide a supporting and locating surface for the benefit of the portable electrical device (not shown) on both the rotatable frame 120 and the two legs of the base frame 110. More specifically, the rotatable frame 120 has a supporting surface and the two legs of the base frame 110 respectively have a bottom-supporting surface on the end, wherein the supporting surface and the bottom-supporting surfaces are facing the portable electrical device (not shown) and formed with said non-slip pads 113.

In the general manner of a bayonet mounting, each leg of the base frame 110 has a through hole 111 transversely penetrating through the end portion thereof. Moreover, a ring-shaped protrusion 112 is formed on an inner surface of the base frame 110 in the through hole 111. At least one L-shaped sliding groove 1111 is defined in the inner surface, extending from the front edge of the protrusion 112 to the outside of the through hole 111. The sliding groove 1111 is composed of a guiding groove portion 1112 and an engaging groove portion 1113. The guiding groove portion 1112 extends in a direction parallel to an axial direction of the through hole 111 (the axis VI). The engaging groove portion 1113 communicates with the guiding groove portion 1112, and extends along a circumferential direction of the through hole 111.

In this embodiment, the support 100 further includes an adjusting knob assembly 210 disposed one side of the base frame 110. The adjusting knob assembly 210 is a triple-ladders-stepped cylinder and is composed of an operating knob 211, an insertion portion 212 and a second shaft 213. The operating knob 211 has the biggest diameter, and the insertion portion 212 is smaller in diameter and protrudes from the operating knob 211 The second shaft 213 is protruding from the insertion portion 212, and aligned with the first shaft 121.

Moreover, in the general manner of a bayonet cap for a bayonet mounting, a guiding rib is formed on the insertion portion 212, which is slidable in and along the guiding groove portion 1112 and is engagable in the engaging groove portion 1113. Meanwhile, a plurality of outer teeth 215 are formed on an outer circumferential surface of the second shaft 213, which makes the second shaft 213 passable through the protrusion 112 and insertable into the recess with the outer teeth 215 engaged with the respective inner teeth 1211. Meanwhile, a spring element 30 forms a sleeve over the second shaft 213 to surround it. In this embodiment, the spring element 30 is a coil spring.

Figure 5:
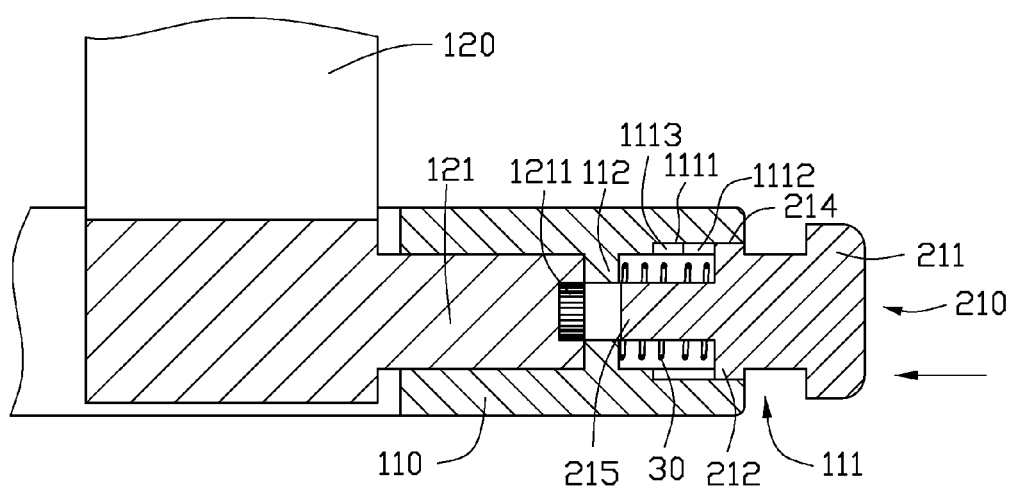
FIG. 5 is a cross-sectional view of the support in the adjustable position.
Figure 6:
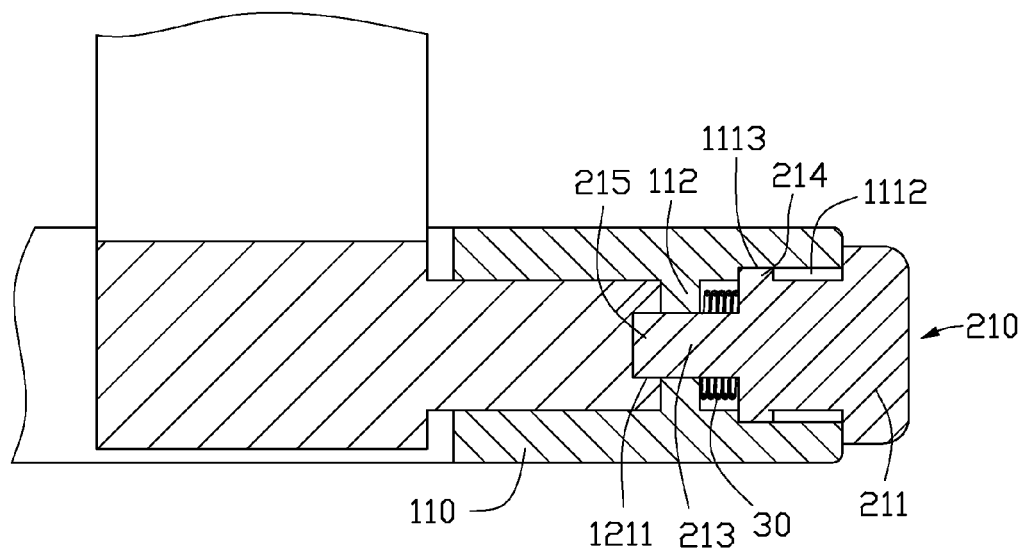
FIG. 6 is a cross-sectional view of the support in the fixed position.

Referring to FIG. 5 and FIG. 6. The following description will accordingly illustrate how to assemble the structure and the adjustment process in detail.

As shown in FIG. 5, the two legs of the rotatable frame 120 are located between the two legs of the base frame 110, and the first shafts 121 are rotatably received in the through hole 111 of the base frame 110. The adjusting knob assembly 210 rotatably inserts in the through hole 111, wherein the outer teeth 215 intrudes into the hole surrounded by the protrusion 112 to engage with the inner teeth 1211, and the guiding rib 214 is rotatably received in the sliding groove 1111. The spring element 30 is compressed between the protrusion 112 and the insertion portion 212, while one end of it is retained by the protrusion 112 and another end is retained by the insertion portion 212. The operating knob 211 is outside the through hole 111.

The guiding rib 214 is slidably disposed of the sliding groove 1111, sliding circumferentially or axially with the guidance of the sliding groove 1111. When the guiding rib 214 slides axially, it means the guiding rib 214 slides parallel to the axis VI; when the guiding rib 214 slides circumferentially, it means the guiding rib 214 slides along the path revolving around the axis VI. The sliding length and the rotating angle of the guiding rib 214 are restrained by the shape of the sliding groove 1111, for controlling the adjusting knob assembly 210 switch between an adjustable position and an fixedly position.

Referring to FIG. 5, as shown, the guiding rib 214 is received in the guiding groove portion 1112 of the sliding groove 1111. Meanwhile, the operating knob 211 exposes from the base frame 110 for a certain distance and the outer teeth 215 is separated from the inner teeth 1211 as a result of the pressure of the spring element 30. Thus, user can rotate the rotatable frame 120 around the base frame 110 to adjust the relative angle thereof.

Referring to FIG. 6, as shown, when user has already adjusted the relative angle to desired one, he/she can press the adjusting knob assembly 210 inwardly to lead the guiding rib 214 received in the engaging groove portion 1113. Meanwhile, the spring element 30 is compressed and the outer teeth 215 engages with the inner teeth 1211. Thus, the outer teeth 215 restrains the rotation of the inner teeth 1211, fastening the base frame 110 with the rotatable frame 120. As a result, the support 100 can stably support the portable electrical device with a desired angle.

Figure 7:
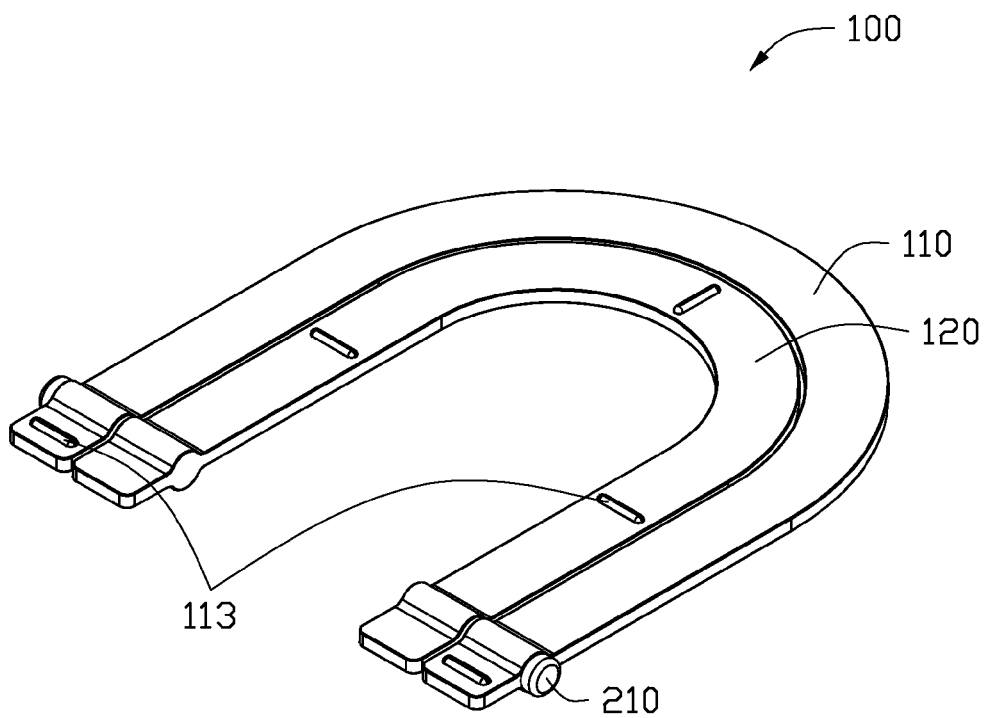
FIG. 7 is a perspective view of the support in another state.

Referring to FIG. 7, it shows the support 100 being in the portable state. As shown, the support 100 is shaped flat, which can be easily carrying and saving space.

In other embodiments of the present disclosure, the support 100 can has only one adjusting knob assembly 210, and coupling one leg of the rotatable frame 120 with one leg of the base frame 120, while another leg of aforesaid rotatable frame 120 and another leg of aforesaid base frame 100 are connected movably with each other.

While the disclosure has been described in connection with what is considered the most practical and preferred embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A support for a portable electrical device, comprising:
a base frame including:
two through holes;
a protrusion formed on an inner surface of the base frame in each through hole; and
an L-shaped sliding groove defined in the inner surface in each through hole, the sliding groove including:
a guiding groove portion extending in a direction parallel to an axial direction of the through hole; and
an engaging groove portion communicating with the guiding groove portion, the engaging groove portion extending along a direction substantially perpendicular to the axial direction of the through hole;
a rotatable frame pivotably coupled to the base frame, the rotatable frame including:
two first shafts rotatably inserted into the through holes, the first shaft including a circular recess defined in an end face facing the protrusion, and a plurality of inner teeth formed on an internal circumferential sidewall in the recess;
an adjusting knob assembly including:
an operating knob located outside the through hole;
an insertion portion received in the through hole;
a guiding rib formed on the insertion portion, the guiding rib being slidable in and along the guiding groove portion and engagable in the engaging groove portion;
a second shaft extending from the insertion portion; and
a plurality of outer teeth formed on an outer circumferential surface of the second shaft, the second shaft being passable through the protrusion and insertable into the recess with the outer teeth engaged with the respective inner teeth; and
a spring element compressed between the protrusion and the insertion portion.

2. The support according to claim 1, wherein the first shaft is aligned with the second shaft.

3. The support according to claim 1, wherein the protrusion is ring-shaped.

4. The support according to claim 1, wherein the spring element is a coil spring surrounding the second shaft.

* * * * *